United States Patent [19]

Severtson et al.

[11] Patent Number: 5,194,995
[45] Date of Patent: Mar. 16, 1993

[54] METHOD AND APPARATUS FOR RECORDING COMPRESSED DATA ON DAT MEDIA

[75] Inventors: Eric L. Severtson, Trabuco Canyon; Roger G. Mintzlaff, Santa Ana, both of Calif.

[73] Assignee: WangDAT, Inc., Irvine, Calif.

[21] Appl. No.: 639,017

[22] Filed: Jan. 9, 1991

[51] Int. Cl.$^5$ .............................................. G11B 5/09
[52] U.S. Cl. ................................. 360/48; 364/939.3
[58] Field of Search ........................ 360/39, 40, 48; 364/939.3

[56] References Cited

U.S. PATENT DOCUMENTS 4,891,784  1/1990  Kato et al. ......................... 364/900

FOREIGN PATENT DOCUMENTS 0323890  1/1989  European Pat. Off. .
0323910  1/1989  European Pat. Off. .
0323911  1/1989  European Pat. Off. .
0327188  1/1989  European Pat. Off. .
0327201  1/1989  European Pat. Off. .
0329265  4/1989  European Pat. Off. .

OTHER PUBLICATIONS

8th Draft, Proposed American National Standard, Helical Scan Digital Computer Tape Cartridge, 3.81 mm (0.150 in), "Digital Data Storage (DDS) Recorded Format For Information Interchange", Sep. 28, 1990.

Primary Examiner—Vincent P. Canney
Attorney, Agent, or Firm—Robbins, Dalgarn, Berliner & Carson

[57] ABSTRACT

A method and apparatus for storing compressed data on DAT media. The data is stored into a standard DDS group format prior to compression, and after compression, the group is stored into a variable number of frames for recording onto the DAT media. If the compression does not meet a predetermined standard of efficiency, then the group is stored in a fixed number of frames and recorded onto the DAT media without compression.

1 Claim, 3 Drawing Sheets

METHOD AND APPARATUS FOR RECORDING COMPRESSED DATA ON DAT MEDIA

BACKGROUND OF THE INVENTION

1. Field of the Invention

This invention relates to digital data recording, and more particularly, to a method and apparatus for recording compressed data on digital audio tape (DAT) media.

2. Description of Related Art

Magnetic tape storage devices are widely used for the storage of large amounts of digital data, because they provide an economical and reliable means for temporary and permanent storage. Because magnetic tape systems inherently rely on serial recording, access times are substantially longer than other storage devices, but at the same time the danger of catastrophic failure is virtually absent. Thus, it has become common practice to utilize tape systems as data backup for floppy disk and hard disk files.

Tape drive systems have evolved over the recent past with technical improvements that have resulted in substantial increases in capacity accompanied by significant decreases in size. Large self-contained tape transports using parallel track recording techniques and relatively wide tape are well known in the art, but these devices are incompatible in size, cost and power requirements with the compact computer systems that are now employed. Further, threading of tape in reel-to-reel devices has always been a cumbersome task, so that efficient tape cartridge systems have been invented for compact computer systems.

More recently, helical scan recording techniques originally devised for video recording have been adapted to provide high density, high fidelity, digital audio tape recordings. A standard digital audio tape (DAT) format has been adopted in order to achieve uniformity in the mass production and marketing of entertainment oriented materials in the audio portion of the frequency spectrum. In addition, a digital data storage (DDS) format for DAT media has been standardized as described, for example, in the publication: American National Standards, "Digital Data Storage (DDS) Format For Information Interchange", 8th Draft, Sep. 28, 1990, which publication is incorporated herein by reference.

Refer now to FIG. 1, which is a diagram describing the standard format and layout of control information and data on DAT media. A helical-scan tape deck passes a tape at a predetermined angle across a rotary head drum with a wrap angle of 90°. The head drum typically houses two read/write heads which are angularly spaced by 180°. The heads write overlapping oblique tracks 10 and 12 across the tape. The track 10 written by a first head has a positive azimuth, while the track 12 written by a second head has a negative azimuth. Each pair of positive and negative azimuth tracks 10 and 12 constitute one frame 14.

Each track 10 and 12 comprises two marginal areas 16, two subcode areas 18, two automatic track following (ATF) areas 20, and a main area 22. The subcode areas 18 are primarily used to store auxiliary information, for example, as to the logical organization of the main area 22, its mapping on to the tape, certain recording parameters (such as format identity, tape parameters, etc.), and tape usage history. The ATF areas 20 provide signals enabling servos to control the heads so that they accurately follow the tracks. The main area 22 is used primarily to store the data provided to the apparatus, although certain auxiliary information is also stored in this area.

Refer now to FIG. 2, which is a diagram describing the DDS format for DAT media, wherein each frame 14 illustrated therein consists of two tracks as indicated in FIG. 1. In the DDS format, data is stored in the main area 22 as a sequence of groups 24 on the tape, each group 24 having a fixed number, i.e., 22, of frames 14 and thus a fixed capacity. Each frame 14 stores 5756 bytes of data, so the capacity of a group 24 is 126,632 bytes of data. An index section 26 in each group 24 identifies the records, file marks, and save set marks contained in the group 24. Adding this level of indexing allows for variable length records and marks to be encoded on to the tape in the most efficient manner possible. Each group 24 may also be followed by additional error correction data comprising a frame 14 of ECC data.

The index section 26 is divided into two parts: the Block Access Table (BAT) 28 and the Physical Information Table (PIT) 30. The BAT 28 describes the contents of the group 24 and contains an entry 32 for each record, file mark, and save set mark. The size of the BAT 28 varies depending upon the contents of the group 24. The PIT 30 contains a list of counters and pointers describing the characteristics of the group 24, including the number of entries 32 in the BAT 28, the file mark count, the file mark count, the save set count, the record count in the group 24, etc.

Using the DDS format, each 60 meter cartridge has a data capacity of 1.3 gigabytes so that at a sustained transfer rate of 183 kilobytes/second there is a capacity for receiving 2 hours of data, equivalent to the contents of two large 650 megabyte disk drives. Thus, the DDS format for DAT media provides a significant enhancement and improvement to the art of digital recording.

Compression schemes have been devised so as to make even more efficient use of DAT media. Compression is typically applied to data prior to applying the DDS format so that compatibility with the DDS format is maintained. Thus, compression may be performed on each record, or, a number of records are combined into a compressed super-record, prior to arranging the records into frames 14 and groups 24.

Prior compression schemes, however, suffer from numerous disadvantages. For example, record compression is often inefficient because of the relatively small size of the records. Further, the BAT and PIT are not compressed. In addition, although unused space within a record may be compressed, unused space within a group 24 will not be compressed. Also, the size of the uncompressed data read from the DAT media cannot be known in advance and therefore memory management is complicated. Thus, whatever the merits of these prior compression schemes, they do not achieve the benefits of the present invention.

SUMMARY OF THE INVENTION

To overcome the limitations in the prior art described above, and to overcome other limitations in the prior art that will become apparent upon reading and understanding this specification, the present invention discloses a method and apparatus for storing compressed data on DAT media. Data is arranged into a DDS group format prior to compression, and after compression, the group is recorded in a variable number of frames on the DAT media. If the compression does not meet a predetermined standard of efficiency, the group is recorded onto the DAT media without compression in the standard DDS format. Thus, a device implementing the present invention may read data recorded either in the compressed format or in an uncompressed, standard DDS format, so that compatibility with existing DDS formatted DAT media is maintained.

The present invention provides a number of advantages over other methods. For example, the present invention provides a better compression ratio than record compression, since the entire contents of the group 24 including the BAT and PIT are compressed. In addition, any unused space within a group 24 may be compressed to a minimal size, so in cases where an incomplete group 24 must be flushed to the DAT media, any loss in capacity is minimized. The size of the uncompressed data is always known in advance because it equals the size of an uncompressed DDS group 24, thereby simplifying memory management. Further, the concept of the DDS group 24 is maintained. If the data does not compress to a size smaller than a predetermined value, then the uncompressed data is recorded, thereby preventing any loss of capacity due to inefficient compression. Additional advantages to the present invention will become apparent upon reading and understanding this specification.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention supplements the standard DDS format for data storage on DAT media with a compression technique so as to make more efficient use of the media. Data is stored into a DDS group 24 prior to compression, and after compression, the group 24 is recorded in a variable number of frames on the DAT media. If the compression does not meet a predetermined standard of efficiency, the group 24 is recorded onto the DAT media without compression in the standard DDS format.

HARDWARE COMPONENTS

Figure 1:
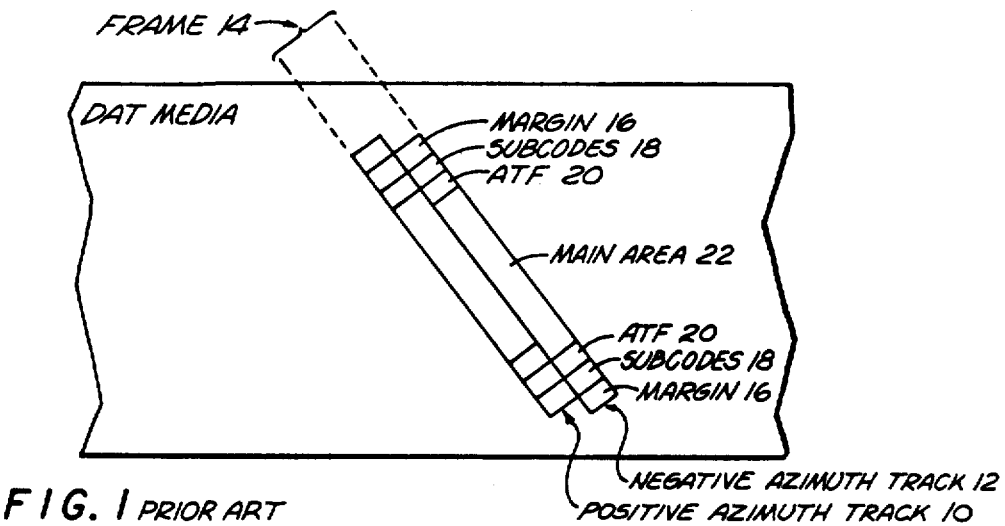
FIG. 1 is a diagram describing the format of control information and data on DAT media.
Figure 2:
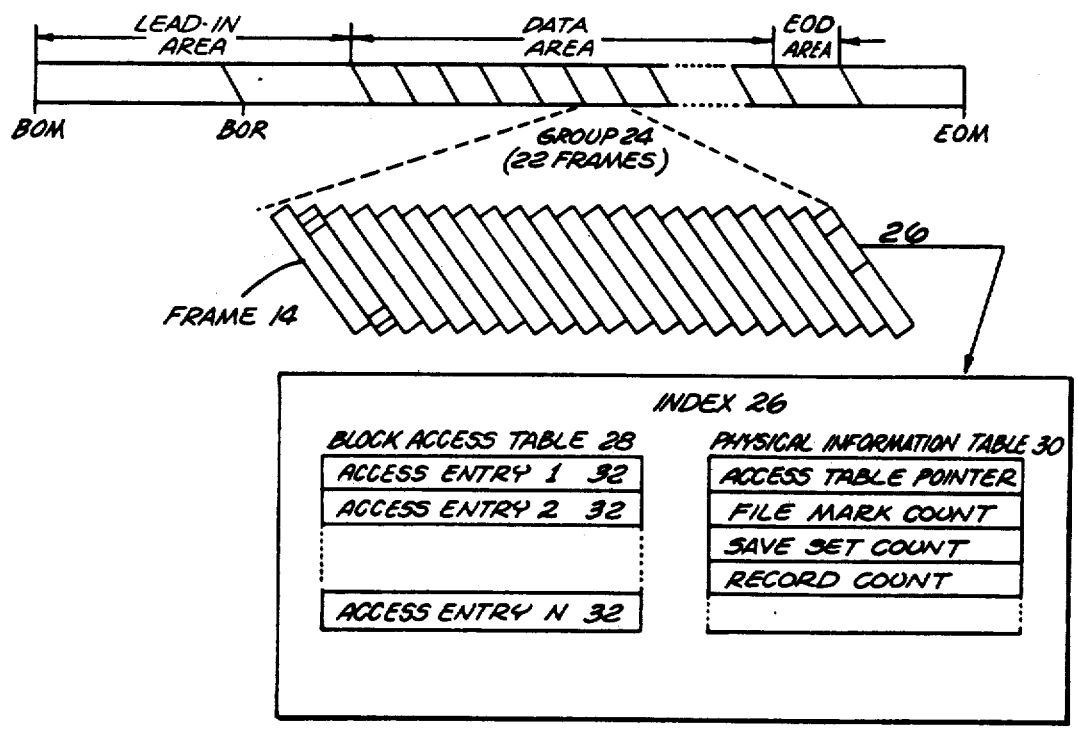
FIG. 2 is a diagram describing the standard DDS format for DAT media.
Figure 3:
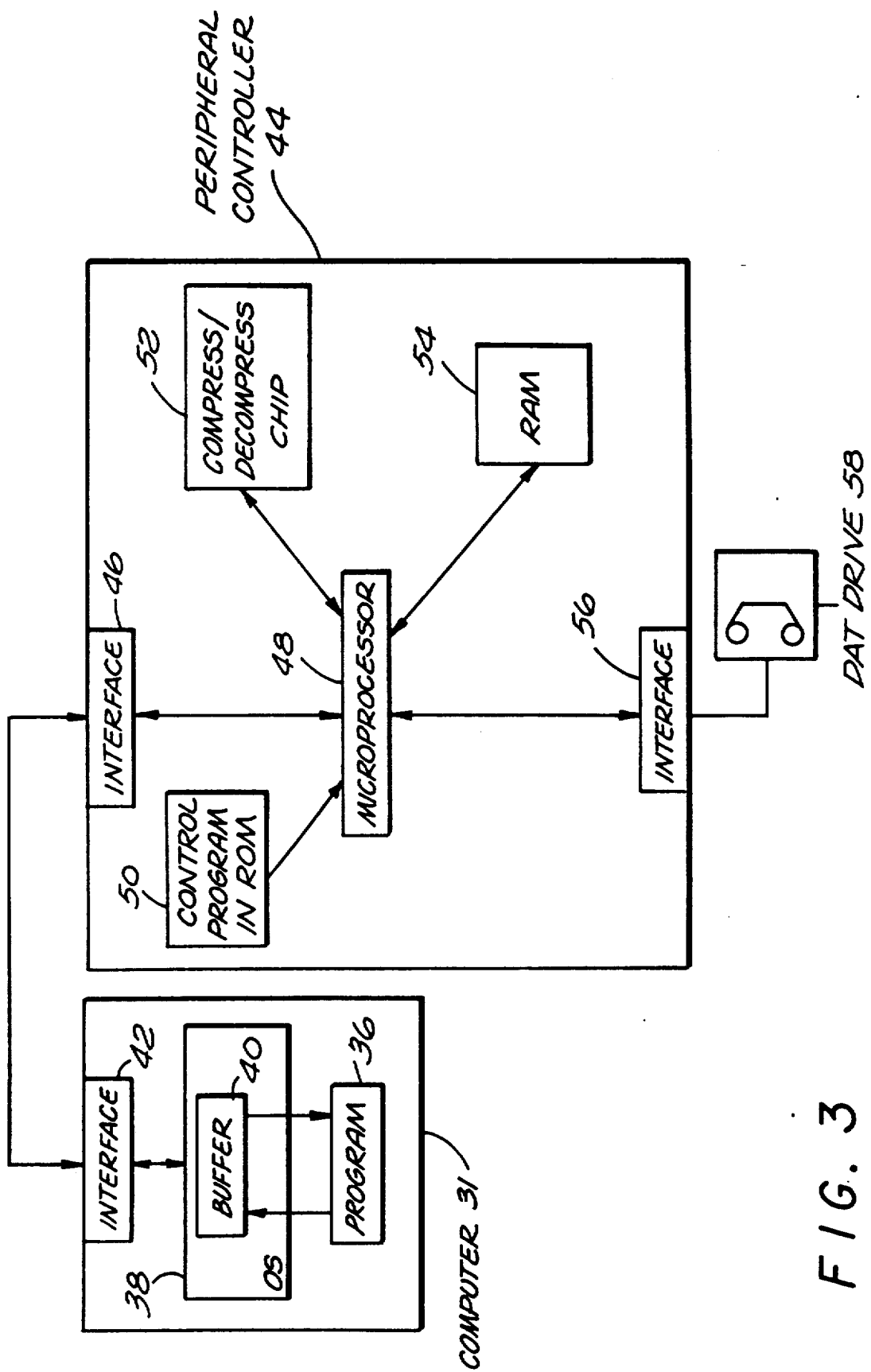
FIG. 3 is a diagram of the hardware components of an exemplary computer system using the present invention.

FIG. 3 illustrates the hardware components of an exemplary computer system using the present invention. Those skilled in the art will recognize that the exemplary computer system and the functions performed thereby are not critical to the use of the present invention and that other arrangements of components and functions may used instead.

In the exemplary system, a computer 34 executes a program 36. To record data onto the DAT media, the program 36 first places the data in a buffer 40. The operating system 38 transmits the data from the buffer 40 via an interface 42 to a peripheral controller 44.

The peripheral controller 44 is comprised of an interface 46 for receiving data from the computer 34, a microprocessor 48 having a ROM 50, a compression/decompression engine 52, a RAM 54, and a DAT drive interface 56 connected to a DAT drive 58. A program stored in the ROM 50 is executed by the microprocessor 48.

When data is to be recorded onto the DAT media, the ROM program executed by the microprocessor 48 receives the data from the computer 34, stores it in the RAM 54, and formats it into a group according to the DDS format. The program instructs the compression engine 52 to compress the group, then formats the group into frames and transmits the frames to the DAT drive 58 for recording.

When data is to be retrieved from the DAT media, the ROM program executed by the microprocessor 48 receives the frames from the DAT drive 58 and concatenates the frames in the RAM 54. The ROM program instructs the decompression engine 52 to decompress the concatenated frames, if required, into a DDS group format. The ROM program can then transmit the group, or portions thereof, to the computer 34.

RECORDING DATA

Figure 4:
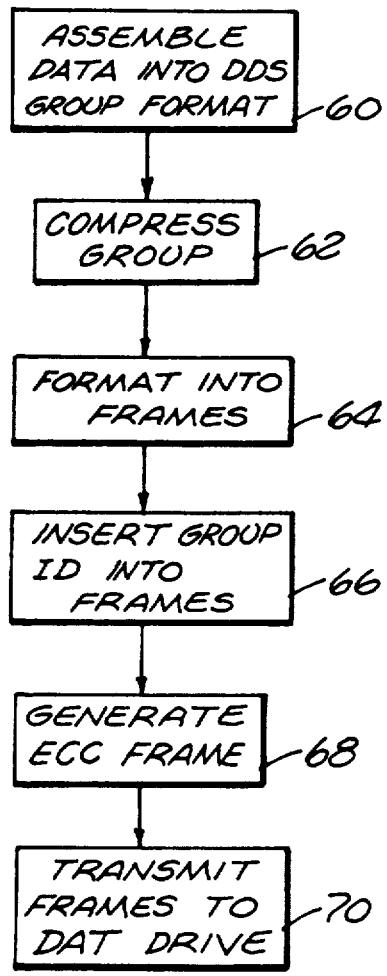
FIG. 4 is a flowchart describing the logic used in recording data onto the DAT media.

FIG. 4 is a flowchart describing the functions performed by the ROM program in recording data onto the DAT media.

Block 60 represents the formatting of data received from the computer 34 into a DDS group. Alternatively, those skilled in the art will recognize that the computer 34 could transmit data to the peripheral controller 44 already formatted into a DDS group.

Block 62 represents the compression of the group by the compression engine 52. The entire contents of the group, including unused portions, the PIT, and the BAT, are compressed by the compression engine 52. Prior to compression, any unused space, e.g., between the last data byte and the first BAT entry, may be zeroed out to improve compression efficiency. Those skilled in the art will recognize that alternative values (e.g., spaces) and/or methods can be substituted to enhance the compression.

Figure 6:
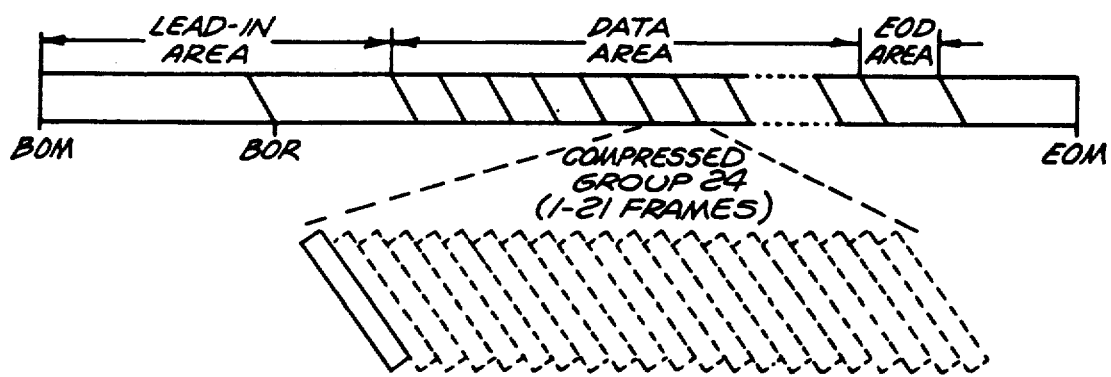
FIG. 6 is a diagram describing the compressed DDS format for DAT media.

Block 64 represents the formatting of the compressed group into frames. When a group is compressed from 126,632 bytes to less than that number, the result is recorded using only the required number of frames, thus providing variable length group sizes from 1 to 22 data frames. In the preferred embodiment, the compressed group is formatted into an integer multiple of frames. Further, if the compression operation does not yield a reduction in size of at least one data frame, i.e., 21 data frames or less, the compressed group is discarded and the uncompressed group is formatted into 22 data frames, i.e., the standard DDS format. Therefore, in the preferred embodiment, if there are 22 data frames in the group, then the group is not compressed; if there are 21 or less data frames in the group, then the group is compressed. FIG. 6 illustrates the number of possible data frames in a compressed group, wherein the minimum number, i.e., 1, of data frames is indicated by the unbroken outline and the maximum number, i.e., 21, of data frames is indicated by the broken outline.

Block 66 represents the insertion of group identifiers into each frame. In the preferred embodiment, these group identifiers, indicating the group number of the frame and the number of frames in the group, are stored in the subcode areas of the frames. Those skilled in the art will recognize that other methods of identifying groups can also be used, for example, tracking frame id entries and logical frame numbers.

Block 68 represents the optional generation of an ECC frame over the data frames for appending after the data frames.

Block 70 represents the transmittal of the data frames and the ECC frame from the peripheral controller 44 to the DAT drive 58 for recording.

RETRIEVING DATA

Figure 5:
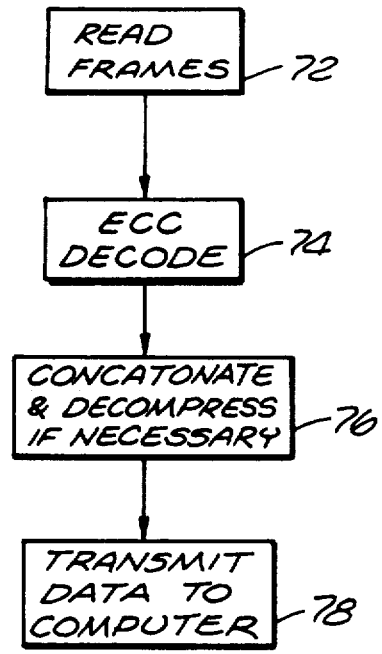
FIG. 5 is a flowchart describing the logic used in retrieving data from the DAT media.

FIG. 5 is a flowchart describing the functions performed by the ROM program executed by the microprocessor 48 in retrieving data from the DAT media.

Block 72 represents the reading of all frames within a group from the DAT drive 58. In the preferred embodiment, groups are identified by a common group identifier in the subcode area, although those skilled in the art will recognize that other methods of identifying groups can also be used, for example, tracking frame id entries and logical frame numbers. Further, as indicated above, if there are 22 data frames in the group, then the group is not compressed; if there are 21 or less data frames in the group, then the group is compressed.

Block 74 represents the ECC decode operation, which occurs before any decompression is performed to determine if any errors occurred during the reading of the data frames and to correct the errors if possible.

Block 76 represents the concatenation of the data frames in the RAM 54, and if required, the subsequent decompression thereof. A compressed group always decompresses to 126,632 bytes and an uncompressed group always comprises 126,632 bytes. Therefore, the present invention simplifies the task of memory management. Further, compatibility with existing DAT media using the standard DDS format is maintained, because the exemplary system can read DAT media storing data in the standard DDS format.

Block 78 represents the transmittal of data to the computer 34 in the appropriate manner. Those skilled in the art will recognize that the data could be transmitted to the computer 34 formatted as a DDS group, on record-by-record basis, or some other similar manner.

READ-AFTER-WRITE

To verify that the data was actually written onto the DAT media correctly, the data must be read later. The standard DDS format provides this by supporting a read-after-write technique. In the standard DDS format, after each frame has been written, the frame is read and examined to check that it has been recorded correctly.

When a frame is identified as being bad, it is rewritten further down the DAT media. However, the bad frame does not have to be rewritten immediately. The frame can be written after 0, 1, 2, 3, 4 or 5 other frames have been written. Each frame, and the 1, 2, 3, 4 or 5 in sequence after it, can be rewritten multiple times to allow for skipping over bad areas on the DAT media. In the standard DDS format, the maximum number of instances of the repeated sequence is 128, i.e., the original and up to 127 repeats.

If a frame is bad, and other frames are written on the DAT media before it is rewritten, then these frames must start with the frame whose logical frame number is the next in the normal sequence and must follow the correct sequence thereafter. The normal sequence requires the next frame to be a frame with a logical frame number greater by 1, unless the bad frame is the last in a group, in which case it is 0 for an amble frame (which is used to separate groups) or 1 for the first frame of the next group. The correct sequence thereafter requires successive frames to have logical frame numbers which increment by 1 until the last frame in the group, after which they restart from 0 (for an amble frame) or 1 (for the first frame of the next group). Multiple amble frames are allowed in this sequence, provided the limit of 5 extra frames is not exceeded. All these other frames must have correct contents. These requirements exist to ensure that extra frames are recognized as such, especially in the event that rewritten frames are unreadable, and are not inadvertently used to supply data. Once a frame has been written successfully, any other frames which were also written between the bad frame and the successful rewrite must also be rewritten in the correct sequence.

When reading a group, any rewritten frames need to be identified. If a frame has been rewritten, there will be more than one frame in the group with the same logical frame number. To recover the data in the group, all that is required is to make sure that at least one frame having each logical frame number is read in the proper order. Any duplicates are to be ignored. If any frame is unreadable, the drive should read ahead up to 6 frames to see if that frame has been rewritten. If it has, the rewritten frame should be used and the drive should continue reading from that point.

For additional data reliability, frames can be written multiple times whether or not the drive is equipped with read-after-write capability.

APPENDING

A group can be written after any other group on the DAT media. However, once a group has been written on the DAT media, any data which was previously written further down a current partition becomes logically inaccessible.

In the standard DDS format, the last frame of a group is identified by the last frame ID entry set to 1. If the last frame of a group has to be rewritten because the read-after-write process detects an error, the last time it is written on the DAT media identifies the end of the group. Any appending may occur only after this point on the DAT media. Any frames from the old next group which are located between the bad and rewritten good last frame are no longer valid.

MODIFICATIONS TO READ-AFTER-WRITE AND APPENDING

In the present invention, the existing rules for read-after-write and appending remain substantially intact and compatible with the standard DDS format. A previously impossible situation arises, however, because groups in the present invention can contain a variable number of frames, i.e., less than 22 data frames.

This is best illustrated by the following example. Assume that an ECC frame is recorded for each group. Thus, the smallest possible group size is two frames, i.e., one compressed data frame and one ECC frame. Under the worst case read-after-write rule, five frames may follow a frame that needs to be rewritten. However, if three groups are recorded, i.e., Group N, N+1, and N+2, each having just two frames, then the re-write of frames in Group N could occur after Group N+2 has been recorded. The rewriting rule implies that a frame from Group N may be rewritten: (a) before Group N is concluded; and (b) after Group N+1 has begun, but before the first instance of frame six of Group N+1 is written.

The problem, of course, is that Group N+1 in the present invention may contain fewer than six frames. It follows, therefore, that the rewriting rule may be re-stated more succinctly in the present invention as: "a frame from Group N must be rewritten prior to writing the first instance of the last frame of Group N+1."

Numerous methods could be used to conform to this rule. However, it may be noted that if Group N+1 contains X number of frames and a particular device can always rewrite a frame after no more than Z subsequent frames ($Z <= 5$), then writing Y ambles between Groups N and N+1 is sufficient to guarantee conformance to the rewriting rule, where:

$$Y = Z - X + 1, Y >= 0 \qquad (1)$$

To verify that this is indeed true, examine the worst case scenario, wherein Group N+1 contains one data frame and no ECC frame:

$$\begin{aligned} Y &= Z - 1 + 1 \\ &= Z \end{aligned}$$

Thus, the last frame of Group N will be rewritten before the only frame in Group N+1 because (by definition) any frame can be rewritten after no more than Z successor frames. Furthermore, setting $Y=0$ in equation (1) yields:

$$0 = Z - X + 1$$

hence:

$$X = Z + 1$$

This indicates that whenever Group N+1 contains at least $Z+1$ frames, ambles need not be written between Groups N and N+1.

CONCLUSION

In conclusion, a method and apparatus for storing compressed data on DAT media has been described. The data is arranged into a DDS group format prior to compression, and after compression, the group is stored in a variable number of frames for recording on the DAT media. If the compression does meet a predetermined standard of efficiency, then the group is recorded onto the DAT media without compression. An error correcting code for the compressed data may also be recorded onto the DAT media.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of operating a data system including a standard format tape drive to enhance the storage capacity of magnetic media used therewith beyond the capacity of the magnetic media when formatted in said standard format in which record groups each have a fixed, predetermined number of frames of fixed data size, the method comprising the steps of:

operating a standard format tape drive to exchange data in media record groups with a buffer, each such media record group including frames of fixed data size;

operating a data utilization device to exchange data in standard format record groups with the buffer, each such standard format record group including a fixed, predetermined number of frames of data of said fixed data size;

operating a data record group compression device associated with the buffer to form compressed record groups from standard format record groups transferred to the buffer from the data utilization device, each compressed record group being associated with a particular standard record group and including frames of data of said fixed data size;

substituting a compressed record group for the standard format record group associated therewith to form a media record group when the data in said standard record group is to be written to the tape drive if the number of frames of data in the compressed record group is less than said fixed, predetermined number;

operating a data record group decompression device associated with the buffer to form standard record groups from compressed record groups transferred to the buffer from the tape drive; and substituting a standard record group so formed for the compressed record group associated therewith when the data in the compressed record group is to be read by the data utilization device.

* * * * *

UNITED STATES PATENT AND TRADEMARK OFFICE
CERTIFICATE OF CORRECTION

PATENT NO. : 5,194,995

DATED : March 16, 1993

INVENTOR(S) : Eric L. Severtson and Roger G. Mintzlaff

It is certified that error appears in the above-identified patent and that said Letters Patent is hereby corrected as shown below:

Column 8, line 8, after "does" insert --not--.

Signed and Sealed this

Eighth Day of February, 1994

Attest:

BRUCE LEHMAN

Attesting Officer

Commissioner of Patents and Trademarks